United States Patent
Lin et al.

(10) Patent No.: US 11,877,249 B2
(45) Date of Patent: Jan. 16, 2024

(54) METHOD AND SYSTEM FOR DETERMINATION OF SYNCHRONIZATION SIGNAL (SS) BLOCK MAPPING PATTERN IN A WIRELESS NETWORK

(71) Applicant: Telefonaktiebolaget LM Ericsson (publ), Stockholm (SE)

(72) Inventors: Zhipeng Lin, Jiangsu (CN); Asbjörn Grövlen, Stockholm (SE); Fredrik Ovesjö, Älvsjö (SE); Robert Baldemair, Solna (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 303 days.

(21) Appl. No.: 17/267,924

(22) PCT Filed: Jul. 10, 2019

(86) PCT No.: PCT/CN2019/095462
§ 371 (c)(1),
(2) Date: Feb. 11, 2021

(87) PCT Pub. No.: WO2020/034792
PCT Pub. Date: Feb. 20, 2020

(65) Prior Publication Data
US 2021/0250882 A1    Aug. 12, 2021

(30) Foreign Application Priority Data
Aug. 15, 2018 (WO) ................ PCT/CN2018/100697

(51) Int. Cl.
*H04W 56/00* (2009.01)
*H04L 27/26* (2006.01)
*H04W 72/1263* (2023.01)

(52) U.S. Cl.
CPC ..... *H04W 56/001* (2013.01); *H04L 27/26025* (2021.01); *H04W 72/1263* (2013.01)

(58) Field of Classification Search
CPC .......... H04W 56/001; H04W 72/1263; H04W 56/00; H04W 48/10; H04L 27/26025;
(Continued)

(56) References Cited

U.S. PATENT DOCUMENTS

| | | | |
|---|---|---|---|
| 10,791,576 B2* | 9/2020 | Yoon | ............ H04W 74/006 |
| 2018/0084593 A1* | 3/2018 | Chen | ............ H04L 5/0048 |

(Continued)

FOREIGN PATENT DOCUMENTS

| | | |
|---|---|---|
| AU | 2019322983 A1 | 3/2021 |
| CN | 107846373 A | 3/2018 |

(Continued)

OTHER PUBLICATIONS

Remaining aspects on NR-PBCH contents and payload Vivo 3GPP TSG RAN WG1 meeting #90bis-R1-1717460 Oct. 2017 (Year: 2017).*

(Continued)

*Primary Examiner* — Rina C Pancholi
(74) *Attorney, Agent, or Firm* — NICHOLSON DE VOS WEBSTER & ELLIOTT LLP

(57) ABSTRACT

Embodiments of the invention include methods, systems, and computer programs to determine synchronization signal (SS) block mapping pattern in a wireless network. In one embodiment, a method is implemented in a terminal device for synchronization signal block (SSB) search in a wireless network, the method includes receiving, by the terminal device from a network device, a message containing synchronization signal block (SSB) information indicating a synchronization signal (SS) block subcarrier spacing (SCS) option, where the SS block SCS option maps to a plurality (Continued)

of SS block pattern candidates. The method continues with obtaining SSB candidate locations, using a SS block pattern determination from the plurality of SS block pattern candidates for the terminal device determined.

20 Claims, 18 Drawing Sheets

(58) Field of Classification Search
CPC ..... H04L 5/0087; H04L 5/0064; H04L 5/005; H04L 5/0053; H04L 5/0094; H04L 5/0007; H04L 5/0048; H04J 11/0069
See application file for complete search history.

(56) References Cited

U.S. PATENT DOCUMENTS

| 2018/0176067 | A1* | 6/2018 | Luo | H04W 56/00 |
| 2021/0120585 | A1* | 4/2021 | Yang | H04W 76/27 |

FOREIGN PATENT DOCUMENTS

| CN | 108235435 A | 6/2018 |
| CN | 111919411 A | 11/2020 |
| WO | 2019/028099 A1 | 2/2019 |
| WO | 2019/190251 A1 | 10/2019 |

OTHER PUBLICATIONS

Office Action, AR App. No. 20190102326, dated Sep. 15, 2022, 4 pages (1 page of Partial English Translation and 3 pages of Original Document).
3GPP, "3GPP TS 36.211 V15.2.0", Technical Specification, 3rd Generation Partnership Project; Technical Specification Group Radio Access Network; Evolved Universal Terrestrial Radio Access (E-UTRA); Physical channels and modulation, (Release 15), Jun. 2018, 236 pages.
3GPP, "3GPP TS 36.331 V15.2.2", Technical Specification, 3rd Generation Partnership Project; Technical Specification Group Radio Access Network; Evolved Universal Terrestrial Radio Access (E-UTRA); Radio Resource Control (RRC); Protocol specification, (Release 15), Jun. 2018, 791 pages.
3GPP, "3GPP TS 38.101-1 V15.2.0", Technical Specification, 3rd Generation Partnership Project; Technical Specification Group Radio Access Network; NR; User Equipment (UE) radio transmission and reception; Part 1: Range 1 Standalone, (Release 15), Jun. 2018, 126 pages.
3GPP, "3GPP TS 38.213 V15.2.0", Technical Specification, 3rd Generation Partnership Project; Technical Specification Group Radio Access Network; NR; Physical layer procedures for control, (Release 15), Jun. 2018, 99 pages.
3GPP, "3GPP TS 38.331 V15.2.1", Technical Specification, 3rd Generation Partnership Project; Technical Specification Group Radio Access Network; NR; Radio Resource Control (RRC) protocol specification, (Release 15), Jun. 2018, 303 pages.
Huawei et al., "Clarification on candidate SS/PBCH blocks for cell search", 3GPP TSG-RAN WG4 Meeting #85, R4-1714473, Nov. 27-Dec. 1, 2017, 2 pages.
International Search Report and Written Opinion, PCT App. No. PCT/CN2019/095462, dated Sep. 30, 2019, 9 pages.
Vivo, "Remaining aspects on NR-PBCH contents and payload", 3GPP TSG RAN WG 1 Meeting #90bis, R1-1717460, Oct. 9-13, 2017, 7 pages.
Notification of Reason for Refusal, KR App. No. 10-2021-7004405, dated Feb. 21, 2022, 10 pages (5 pages of English Translation and 5 pages of Original Document).
Samsung, "Remaining Issues about Provision of SI in Connected (RIL# S038)", 3GPP TSG-RAN WG2 meeting #103, R2-1812160, Aug. 20-24, 2018, 6 pages.
Zte, et al., "Remaining Issues for Data Resource Allocation", 3GPP TSG RAN WG1 Meeting #92bis, R1-1803796, Apr. 16-20, 2018, 21 pages.
International Preliminary Report on Patentability, PCT App. No. PCT/CN2019/095462, dated Feb. 25, 2021, 5 pages.
LG Electronics, "RMSI Delivery and CORESET Configuration", 3GPP TSG RAN WG1 Meeting #93, R1-1806602, May 21-25, 2018, 16 pages.
Supplementary European Search Report and Search Opinion, EP App. No. 19849666.3, dated Apr. 20, 2022, 16 pages.
Office Action, KR App. No. 10-2023-7006352, dated Aug. 16, 2023, 5 pages of Original Document Only.
Notice of Final Rejection, KR App. No. 10-2021-7004405, dated Aug. 4, 2022, 9 pages (5 pages of English Translation and 4 pages of Original Document).
Notice of Final Rejection, KR App. No. 10-2021-7004405, dated Nov. 21, 2022, 9 pages (5 pages of English Translation and 4 pages of Original Document).
Office Action, CN App. No. 201980052756.1, dated Nov. 9, 2023, 6 pages of Original Document Only.

* cited by examiner

| NR Operating Band | SS Block SCS | SS Block pattern[1] | Range of GSCN (First – <Step size> – Last) |
|---|---|---|---|
| n1 | 15kHz | Case A | 5279 – <1> – 5419 |
| n2 | 15kHz | Case A | 4829 – <1> – 4969 |
| n3 | 15kHz | Case A | 4517 – <1> – 4693 |
| n5 | 15kHz | Case A | 2177 – <1> – 2230 |
| | 30kHz | Case B | 2183 – <1> – 2224 |
| n7 | 15kHz | Case A | 6554 – <1> – 6718 |
| n8 | 15kHz | Case A | 2318 – <1> – 2395 |
| n12 | 15kHz | Case A | 1828 – <1> – 1858 |
| n20 | 15kHz | Case A | 1982 – <1> – 2047 |
| n25 | 15 kHz | Case A | 4829 – <1> – 4981 |
| n28 | 15kHz | Case A | 1901 – <1> – 2002 |
| n34 | 15kHz | Case A | 5030 – <1> – 5056 |
| n38 | 15kHz | Case A | 6431 – <1> – 6544 |
| n39 | 15kHz | Case A | 4706 – <1> – 4795 |
| n40 | 15kHz | Case A | 5756 – <1> – 5995 |
| n41 | 15kHz | Case A | 6246 – <3> – 6714 |
| | 30 kHz | Case C | 6252 – <3> – 6714 |
| n51 | 15kHz | Case A | 3572 – <1> – 3574 |
| n66 | 15kHz | Case A | 5279 – <1> – 5494 |
| | 30kHz | Case B | 5285 – <1> – 5488 |
| n70 | 15kHz | Case A | 4993 – <1> – 5044 |
| n71 | 15kHz | Case A | 1547 – <1> – 1624 |
| n75 | 15kHz | Case A | 3584 – <1> – 3787 |
| n76 | 15kHz | Case A | 3572 – <1> – 3574 |
| n77 | 30kHz | Case C | 7711 – <1> – 8329 |
| n78 | 30kHz | Case C | 7711 – <1> – 8051 |
| n79 | 30kHz | Case C | 8480 – <16> – 8880 |

Figure.3

```
-- ASN1START
-- TAG-SERVING-CELL-CONFIG-COMMON-START

ServingCellConfigCommon ::=          SEQUENCE {
    physCellId                           PhysCellId
        OPTIONAL, -- Cond HOAndServCellAdd,
    downlinkConfigCommon                 DownlinkConfigCommon
        OPTIONAL, -- Cond InterFreqHOAndServCellAdd uplinkConfigCommon                   UplinkConfigCommon
        OPTIONAL, -- Cond ServCellAdd-UL
    supplementaryUplinkConfig                       UplinkConfigCommon
        OPTIONAL, -- Cond ServCellAdd-SUL
    n-TimingAdvanceOffset                ENUMERATED { n0, n25600, n39936 }
        OPTIONAL, -- Need S
    ssb-PositionsInBurst                 CHOICE {
        shortBitmap                          BIT STRING (SIZE (4)),
        mediumBitmap                         BIT STRING (SIZE (8)),
        longBitmap                           BIT STRING (SIZE (64))
    }
        OPTIONAL, -- Cond AbsFreqSSB
    ssb-periodicityServingCell           ENUMERATED { ms5, ms10, ms20, ms40, ms80, ms160,
spare2, spare1 }         OPTIONAL,    -- Need S
    dmrs-TypeA-Position                  ENUMERATED {pos2, pos3},
    lte-CRS-ToMatchAround                SetupRelease { RateMatchPatternLTE-CRS }
                OPTIONAL,   -- Need M
    rateMatchPatternToAddModList         SEQUENCE (SIZE (1..maxNrofRateMatchPatterns)) OF
RateMatchPattern        OPTIONAL, -- Need N
    rateMatchPatternToReleaseList        SEQUENCE (SIZE (1..maxNrofRateMatchPatterns)) OF
RateMatchPatternId        OPTIONAL, -- Need N
    subcarrierSpacing                    SubcarrierSpacing
            OPTIONAL, -- Need S
    tdd-UL-DL-ConfigurationCommon        TDD-UL-DL-ConfigCommon
                OPTIONAL, -- Cond TDD
    ss-PBCH-BlockPower                   INTEGER (-60..50),
    ...
}

-- TAG-SERVING-CELL-CONFIG-COMMON-STOP
-- ASN1STOP
```

Figure.4

```
-- ASN1START

MeasObjectNR-r15 ::=               SEQUENCE {
    carrierFreq-r15                    ARFCN-ValueNR-r15,
    rs-ConfigSSB-r15                   RS-ConfigSSB-NR-r15,
    threshRS-Index-r15                 ThresholdListNR-r15              OPTIONAL,      --
Need OR
    maxRS-IndexCellQual-r15            INTEGER (1.. maxRS-IndexCellQual-r15)           OPTIONAL,
       -- Need OR
    offsetFreq-r15                     Q-OffsetRangeInterRAT            DEFAULT 0,
    blackCellsToRemoveList-r15         CellIndexList                    OPTIONAL,      --
Need ON
    blackCellsToAddModList-r15         CellsToAddModListNR-r15          OPTIONAL,      --
Need ON
    quantityConfigSet-r15              INTEGER (1.. maxQuantSetsNR-r15),
    cellsForWhichToReportSFTD-r15      SEQUENCE (SIZE (1..maxCellSFTD)) OF PhysCellIdNR-r15
OPTIONAL,    -- Need OR
    ...
}

RS-ConfigSSB-NR-r15 ::=            SEQUENCE {
    measTimingConfig-r15               MTC-SSB-NR-r15, subcarrierSpacingSSB-r15       ENUMERATED {kHz15, kHz30, kHz120, kHz240},
    ...
}
```

Figure.5

| caseBorC | FR1 |
|---|---|
| 0 | 30kHz, case B |
| 1 | 30kHz, case C |

Figure.6A

| subcarrierSpacing | FR1 | FR2 |
|---|---|---|
| 00 | 15kHz, case A | 120kHz, case D |
| 01 | 30kHz, case B | 240kHz, case E |
| 10 | 30kHz, case C | reserved |
| 11 | reserved | reserved |

Figure.6B

METHOD AND SYSTEM FOR DETERMINATION OF SYNCHRONIZATION SIGNAL (SS) BLOCK MAPPING PATTERN IN A WIRELESS NETWORK

CROSS-REFERENCE TO RELATED APPLICATIONS

This application is a National stage of International Application No. PCT/CN2019/095462, filed Jul. 10, 2019, which claims priority to International Application No. PCT/CN2018/100697, filed Aug. 15, 2018, which are hereby incorporated by reference.

TECHNICAL FIELD

Embodiments of the invention relate to the field of wireless communications, and more specifically, relate to a method, system, and computer programs to exchange information for determination of synchronization signal (SS) block mapping pattern in a wireless communication network.

BACKGROUND

In order to connect to a network, a device needs to acquire network synchronization and obtain essential SI (system information). Synchronization signals are used for adjusting the frequency of the device relative to the network, and for finding the proper timing of the received signal from the network. Synchronization signals are transmitted in synchronization signal and PBCH blocks (SS/PBCH blocks, sometimes referred to simply as SS blocks (or SSBs), the terms "SS/PBCH block," "SS block," and "SSB" are used interchangeably in this disclosure). SS/PBCH blocks are transmitted from a network device (e.g., a base station) to a terminal device (e.g., a user equipment (UE)).

Various physical broadcast channel transmission schemes may be used to transmit the synchronization signals, and some have been standardized. Yet these schemes are lack of a consistent way for a terminal device to determine which synchronization signal (SS) subcarrier spacing (SCS) option to use to identify the Synchronization Signal and Physical Resource (SS/PBCH) blocks from a network device, when the terminal device supports multiple SS block pattern candidates with the same subcarrier spacing.

SUMMARY

Embodiments of the invention offer efficient ways for a terminal device to obtain synchronization signal block (SSB) candidate locations from a network device message, when the message indicates a synchronization signal (SS) block subcarrier spacing (SCS) option, and the SS block SCS option maps to a plurality of SS block pattern candidates. Using the SSB candidate locations, the terminal device may extract information carried in SS/PBCH blocks, and use the information to determine downlink timing, frequency offset, and to acquire system information from the PBCH.

Embodiments of the invention include methods to determine synchronization signal (SS) block mapping pattern in a wireless network. In one embodiment, a method is implemented in a terminal device for synchronization signal block (SSB) search in a wireless network, the method includes receiving, by the terminal device from a network device, a message containing synchronization signal block (SSB) information indicating a synchronization signal (SS) block subcarrier spacing (SCS) option, where a plurality of SS block pattern candidates are compatible with the SS Block SCS option. The method continues with obtaining SSB candidate locations, using a SS block pattern selection from the plurality of SS block pattern candidates for the terminal device selected.

Embodiments of the invention includes terminal devices to determine synchronization signal (SS) block mapping pattern in a wireless network. In one embodiment, a terminal device comprises a processor and computer-readable storage medium (949) that provides instructions that, when executed by the processor (942), perform one or more methods of the embodiments of the invention.

Embodiments of the invention include computer-readable storage media that provide instructions (e.g., computer program) that, when executed by a processor, cause the processor to perform operations comprising one or more methods of the embodiments of the invention.

BRIEF DESCRIPTION OF THE DRAWINGS

The invention may best be understood by referring to the following description and accompanying drawings that illustrate embodiments of the invention. In the drawings:

FIG. 3 shows synchronization signal block (SSB) block subcarrier spacing (SCS) values for different frequency bands in a frequency range.

FIG. 4 shows a pseudo code for setting subcarrier spacing value according to the background.

FIG. 5 shows syntax of an information element including the subcarrierSpacingSSB-r15 value according to the background.

FIG. 6A shows a bit indicating which SS block pattern is used for a particular SS block SCS option per one embodiment of the invention.

FIG. 6B shows two bit indicating SS block patterns and SS block SCS options within frequency ranges per one embodiment of the invention.

DETAILED DESCRIPTION

Figure 1A:
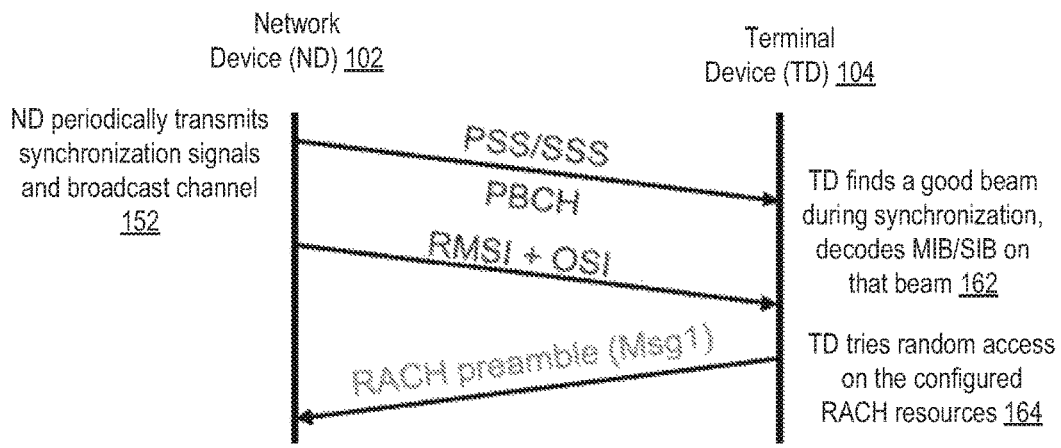
FIG. 1A shows a synchronization process between a network device and a terminal device in a wireless network per one embodiment of the invention.

The following description describes methods, apparatus, and computer programs to determine a synchronization signal (SS) block mapping pattern in a wireless communication network. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems. While LTE-based systems are used as examples in this disclosure, embodiments of the invention apply to other wireless communication networks as well.

A network device (ND) (also referred to as a network node or node, these terms are used interchangeably in this disclosure unless noted otherwise) is an electronic device in a wireless communication network via which a terminal device accesses the network and receives services therefrom. One type of network devices may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box. Note that while UEs are used as examples of terminal devices in this disclosure, embodiments of the invention apply to other terminal devices as well.

Network Device and Terminal Device Communication in a Wireless Network

FIG. 1A shows communications between a network device and a terminal device in a wireless network per one embodiment of the invention. The communications start with the network device 102 periodically transmits synchronization signals and broadcast channel information to the terminal device 104.

In order to connect to a network, a terminal device 104 needs to acquire network sync and obtain essential SI (system information). Sync signals are used for adjusting the frequency of the device relative the network, and for finding the proper timing of the received signal from the network. In a wireless network deploying radio technologies such as the New Radio (NR), the synchronization and access procedure may involve several signals:

Primary synchronization signal (PSS) allows for network detection in the presence of a high initial frequency error, up to tens of ppm. Additionally, PSS provides a network timing reference. 3GPP has selected Zadoff-Chu sequences as PSS signals in LTE and m-sequence is selected in NR.

Secondary synchronization signal (SSS) that allows for more accurate frequency adjustments and channel estimation while at the same time providing fundamental network information, e.g. cell ID.

Physical Broadcast channel (PBCH) that provides a subset of the minimum system information for random access. It will also provide timing information within a cell, e.g. to separate timing between beams transmitted from a cell. The amount of information to fit into the PBCH is of course highly limited to keep the size down. Furthermore, demodulation reference signals (DM-RS) are interleaved with PBCH resources in order to receive it properly.

A synchronization signal and PBCH block (SS/PBCH block) as proposed for NR comprises the above signals (PSS, SSS and related DMRS), and PBCH are always part of the SS/PBCH block.

In the downlink direction, remaining minimum system information (RMSI) and other system information (OSI) may be also transmitted to the terminal device 104. The terminal device then finds a good beam during synchronization, decodes MIB/SIMB on the beam at reference 162. Then the terminal device 104 tries random access on the configured random-access channel (RACH) sources at reference 164. The process continues, and the network device 102 and the terminal device 104 set up connections and agree on the beam to use for the communication between the two devices.

Figure 1B:
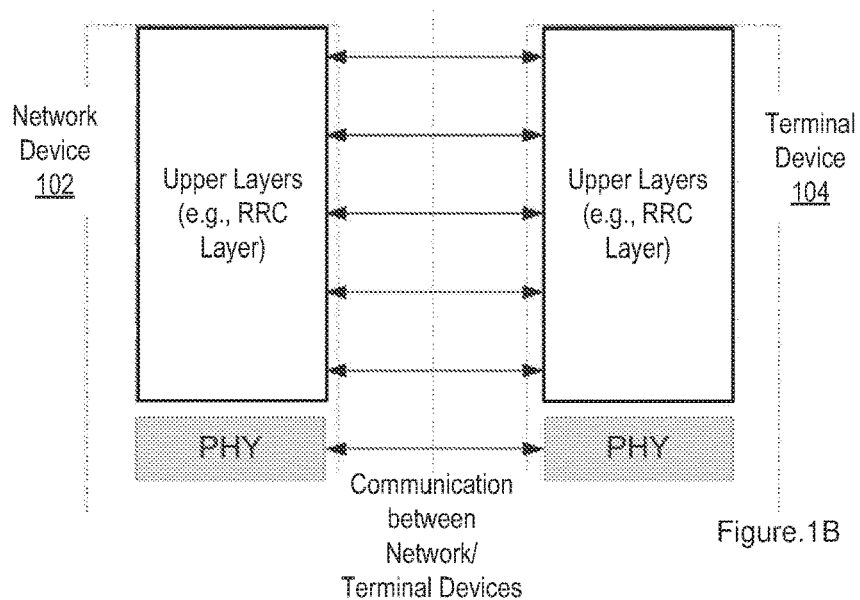
FIG. 1B shows the protocol layers for network device and terminal device communications per one embodiment of the invention.

The communications between a network device and a terminal device include communications on multiple protocol layers. FIG. 1B shows the protocol layers for the communications between a network device and a terminal device per one embodiment of the invention.

At the physical layer ("PHY"), the synchronization between the network device and terminal device is performed. The synchronization may utilize signaling and setting in higher layers of the protocol layers. The upper layers having the signaling and setting includes a radio resource control (RRC) layer. The RRC layer performs functions such as connection establishment and release functions, broadcast of system information, radio bearer establishment, reconfiguration and release, RRC connection mobility procedures, paging notification and release and outer loop power control. The RRC layer may use packet data convergence protocol (PDCP).

Figure 2A:
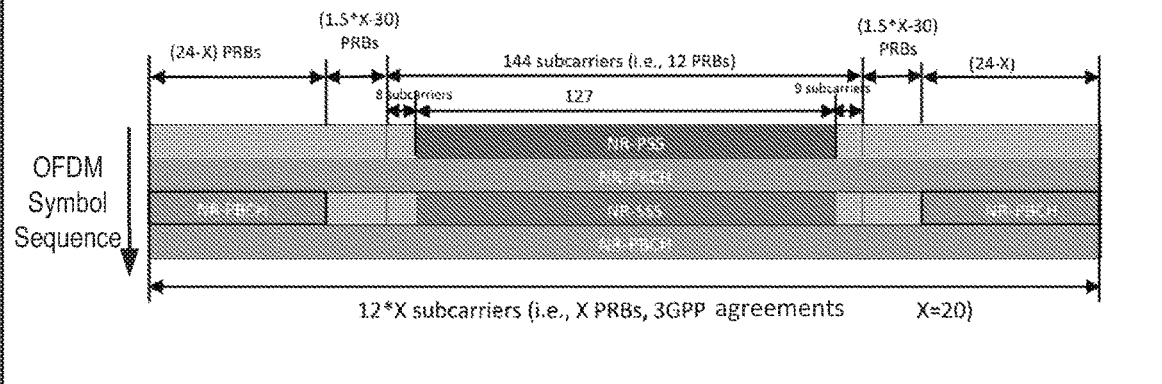
FIG. 2A shows a synchronization signal and physical broadcast channel (SS/PBCH) block per one embodiment of the invention.

SS (Synchronization Signal) and PBCH (Physical Broadcast Channel) (SS/PBCH) Block In one embodiment, synchronization signal utilizes a physical broadcast channel transmission scheme. FIG. 2A shows a SS (Synchronization Signal) and PBCH (Physical Broadcast Channel) (SS/PBCH) block per one embodiment of the invention. Within the SS/PBCH block 202, four OFDM symbols are reserved, e.g., for NR-PBCH, NR-PSS, and NR-SSS transmission. NR-PSS is defined to be 127 subcarriers wide whereas the whole SS block is supposed to be 240 subcarriers wide (X is 20 PRBs in an embodiment). Note that in this embodiment, the SS/PBCH block includes four consecutive OFDM symbols, so to identify the location of the SS/PBCH block, one needs to identify only the location of the first OFDM symbol of the SS/PBCH block.

Figure 2B:
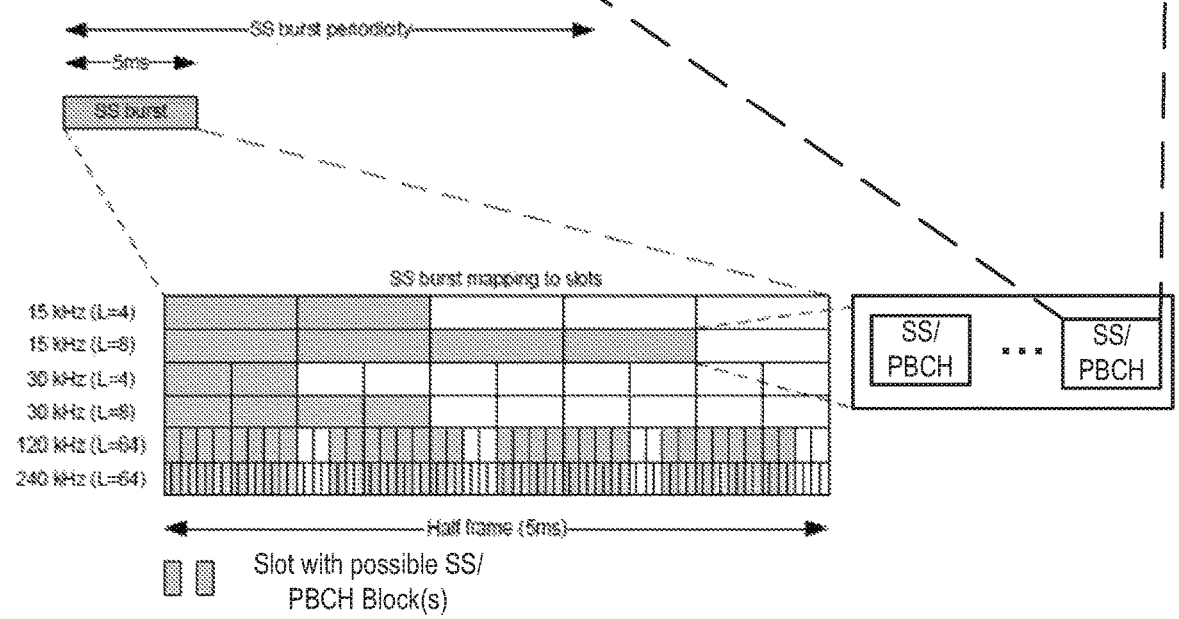
FIG. 2B shows synchronization burst per one embodiment of the invention.

A number of (typically rather close in time) SS/PBCH blocks constitute an SS burst set. An SS burst set is transmitted periodically. FIG. 2B shows a half-frame including SS bursts per one embodiment of the invention. The blocks with possible SS/PBCH blocks are shaded, and each may include one or more SS/PBCH blocks.

A terminal device, by extracting information from the SS blocks in the SS burst set, may determine the downlink timing and/or frequency offset; and it may also acquire some fundamental system information from the PBCH. For the terminal device to extract information from the SS/PBCH blocks, it needs to identify the locations of the SS blocks in a SS burst set. An SS block set may be identified using symbol indexes of a frame, which has a plurality of slots, each of which has 14 OFDM symbols in one embodiment (see FIG. 8A-B for discussion in more details).

For a half frame with SS/PBCH blocks, the first symbol indexes for candidate SS/PBCH blocks are determined according to the subcarrier spacing of SS/PBCH blocks as follows, where index 0 corresponds to the first symbol of the first slot in a half-frame (see TS38.213 V15.2.0, Section 4.1 for further background of the disclosure).

(1) Case A—15 kHz subcarrier spacing: the first symbols of the candidate SS/PBCH blocks have indexes of $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3.

(2) Case B—30 kHz subcarrier spacing: the first symbols of the candidate SS/PBCH blocks have indexes $\{4, 8, 16, 20\}+28*n$. For carrier frequencies smaller than or equal to 3 GHz, n=0. For carrier frequencies larger than 3 GHz and smaller than or equal to 6 GHz, n=0, 1.

(3) Case C—30 kHz subcarrier spacing: the first symbols of the candidate SS/PBCH blocks have indexes $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3.

(4) Case D—120 kHz subcarrier spacing: the first symbols of the candidate SS/PBCH blocks have indexes $\{4, 8, 16, 20\}+28*n$. For carrier frequencies larger than 6 GHz, n=0, 1, 2, 3, 5, 6, 7, 8, 10, 11, 12, 13, 15, 16, 17, 18.

(5) Case E—240 kHz subcarrier spacing: the first symbols of the candidate SS/PBCH blocks have indexes $\{8, 12, 16, 20, 32, 36, 40, 44\}+56*n$. For carrier frequencies larger than 6 GHz, n=0, 1, 2, 3, 5, 6, 7, 8.

Once a terminal device knows that a SS/PBCH block burst follow which of the cases A-E, it may identify the SS/PBCH block. For example, when a terminal device has a carrier frequency no higher than 3 GHz, it knows that the SS/PBCH candidate locations are at index 2, 8, 16, and 22 (following $\{2, 8\}+14*n$, where n=0, 1). The SS/PBCH may be at symbol 2-5, 8-11, 16-19, and 22-25 since each SS/PBCH block is four symbols in one embodiment. Monitoring these locations within a frame, the terminal device may extract SS/PBCH blocks and obtain synchronization information.

The SSB candidate locations are set differently for different subcarrier spacing (SCS) values. Some SSB SCS values are defined in standards, e.g., 3GPP TS 38.101-1 V15.2.0 defines the SSB SCS values for different frequency bands in frequency range 1, which is illustrated in FIG. 3. Note that these SSB SCS values are specified for each operating band, and some operating bands may accommodate more than one SS Block pattern. For example, at operating band n5, both Classes A and B are supported, yet the support is mapped to its subcarrier spacing (SCS) values, i.e., when the terminal device's SCS is 15 k Hz, pattern Class A is defined, and when terminal device's SCS is 30 k Hz, pattern Class B is defined.

The example of FIG. 3 shows the default settings for initial access of a terminal device when it is standalone (has no access to a wireless network such as a LTE network). In other scenarios (e.g., non-initial access through primary cells (PCells), secondary cells (SCells) of secondary cell group (SCG)), the SS block patterns corresponding to SS block SCS values may be specified using messages, such as the one defined in 3GPP TS38.331 V15.2.1. FIG. 4 shows a pseudo code for setting subcarrier spacing value per one embodiment of the invention. Note that the parameter subcarrierSpacing may be set to a value in a ServingCellConfigComm message. The ServingCellConfigComm message may be a message in the RRC layer.

In these other scenarios, the subcarrierSpacing values may one of a set of enumerated values, e.g., 15 kHz, 30 kHz, 120 kHz, and 240 kHz. FIG. 5 shows syntax of an information element including the subcarrierSpacing value per one embodiment of the invention. The information element is MeasObjectNR (see 3GPP TS 36.331) is subcarrierSpacingSSB-r15, and it may be one of the four values corresponding to 15 kHz, 30 kHz, 120 kHz, and 240 kHz.

Ambiguity of SS Block SCS Option and Clarification

A terminal device may receive a SS block SCS option, and the SS block SCS option is definite in some cases. For example, when the terminal device is in a frequency band with the default SCS setting of 30 kHz, and it receives a SS block SCS option of 15 kHz, the terminal device will use case A discussed above, and the 15 kHz subcarrier spacing is set to find the SS/PBCH block candidate locations, which has the first symbols being indexed at $\{2, 8\}+14*n$. Similarly, when the received SS block SCS option requires SCS at 120 kHz or 240 kHz, the terminal device will use cases D and E, respectively. That is the mapping is definite when a terminal device receives an SCS option corresponding to one of cases A, D, and E, as each of them maps to a single SCS option, being 15 kHz, 120 kHz, and 240 kHz, respectively.

If a terminal device receives a message indicating that a SS block SCS option of 30 kHz, and the terminal device is in a frequency band with the default SCS setting of 15 kHz, the SS block SCS option is ambiguous as of whether the terminal device should search for the SSB candidates based on case B or C, since both SS block pattern candidates use SS block SCS option of 32 kHz, yet the SSB candidates are indexed differently in cases B and C. Thus, since the SS block SCS option of 30 kHz can be mapped to two SS block pattern candidates (cases B and C), the terminal device does not know which SS block pattern to use for obtaining the SSB candidate locations.

Embodiments of the invention provides indications of SSB mapping cases to be used when a 30 kHz SSB SCS is indicated in ServingCellConfigCommon. The methods can be to associate the SSB case with the band used, derive it the mapping type from some parameters, to use a predetermined SSB mapping case, to signal the SSB mapping case via higher layer signaling, allow UE to do blind detection with both SSB mapping cases or to support 30 kHz SSB SCS only in frequency band with default 30 kHz SSB SCS where a default case is applied.

That is, embodiments of the invention provide ways to remove ambiguity when a terminal device operates in a frequency band that can accommodate one of a plurality of SS block pattern candidates (e.g., cases B and C in this example). Through embodiments of the invention, a terminal device will be able to identify a single SS block SCS selection for a particular frequency band, even if a received message indicates a SS block SCS option that may be compatible with multiple SS block pattern candidates. Thus, embodiments of the invention identify the SSB candidate locations more efficiently than what has been done. Several sets of embodiments may remove such ambiguity.

A First Set of Embodiments (Method)

Once a terminal device receives a message indicating that a SS block SCS option that maps to a plurality of SS block pattern candidates, the terminal device decodes the message to identify information that helps it determine which of the SS block pattern candidates should be selected as the SS block pattern. The identification may be based on an indication of radio access technology support in the message, the indication indicates at least one of long-term evolution (LTE), new radio (NR).

For example, when a SS block SCS option included in the received message is indicated to be 30 kHz, with which case B and case C are both compatible, the terminal device may decode the message carrying the SS block SCS option indication and determine whether case B or case C should be used as the SS block pattern to identify the SSB candidate locations. Case B is more suitable for a frequency band with LTE and NR coexisting (e.g., using LTE Multicast Broadcast Single Frequency Network (MBSFN) subframes for NR) than case C, thus if values of parameters indicates the LTE-NR coexisting band, the terminal device selects case B as the SS block pattern, otherwise selects case C.

The terminal device may analyze one or more of the following: (1) the presence of lte-CRS-toMatchAround, which indicates NR should rate match around LTE cell specific reference signal (CRS); (2) whether a particular frequency shift (e.g., 7.5 kHz) is indicated (e.g., in the uplink configuration, ConfigCommon of frequencyInfoUL); and (3) whether an indication (e.g., tdd-UL-DL-Configuration-Common) specifies a time division duplex (TDD) frame structure that can coexist with LTE.

A rule may be enforced so that the terminal device may determine which SS block pattern to use when some indications points to a LTE-NR co-existing band while others do not (conflict resolution), e.g., prioritizing one indication over another, voting by majority of the indications, etc.

A Second Set of Embodiments (Method)

In this set of embodiments, a rule may be enforced so that the terminal device has a default configuration for a frequency band. For example, the terminal device receives a message indicating that a SS block SCS option of 30 kHz at operating band n3, where the default SS block SCS is 15 kHz (see FIG. 3). The terminal device may be configured with a default SS block pattern case B when the SS block SCS option of 30 kHz is received.

The default setting to a particular SS block SCS pattern may be selected for a variety of reasons. The terminal device may make the case B as the default SS block pattern because a particular deployment has a high likelihood in LTE-NR co-existing band. The terminal device may make the case C as the default because the particularly deployment has a low likelihood of co-existing LTE-NR. The likelihood of co-existing LTE-NR can be determined by the terminal device with assistance of the network device or be indicated directly by the network device. After the default SS block pattern B or C is configured for a particular band for whatever reason, the terminal device no longer has any ambiguity as of which SS block pattern to use once a corresponding SS block SCS option is received.

In one embodiment, the default configuration for SS block pattern selection is provided to the terminal device as a factory default. In one embodiment, a network device may set the default configuration remotely by sending a message to the terminal device; alternatively, the terminal device may set the default configuration on its own (e.g., based on the wireless network it is deployed).

A Third Set of Embodiments (Method)

In this set of embodiments, a terminal device may determine the SS block pattern to use by decoding signaling of a higher layer (over the physical layer, e.g., the RRC layer). For example, the ServingCellConfigCommon may include one or more bits to indicate the SS block pattern to be used. A bit may be conditioned on whether a particular SS block SCS option (e.g., 30 kHz) is indicated, e.g., by subcarrier-Spacing. When the bit is not set (or undefined), the terminal device may decide that a default mapping to a SS block pattern (e.g., case B for 30 kHz) is used.

FIG. 6A shows a bit indicating which SS block pattern is used for a particular SS block SCS option per one embodiment of the invention. In this example, one bit of value zero indicating a SS block pattern of case B, while value one indicating the SS block pattern of case C.

In some embodiments, multiple bits may be used for SS block pattern in parameters such as subcarrierSpacing. FIG. 6B shows two bit indicating SS block patterns for SS block SCS options within frequency ranges per one embodiment of the invention. With an additional bit, now the parameter subcarrierSpacing indicates not only a SS block pattern for a SS block SCS option, but also the frequency range. Obviously, more bits may provide additional mapping among a SS block pattern, a SS block SCS option, a frequency range, and other parameters. Embodiments of the invention cover the variety of ways to use upper layer signaling bits to assist the identification of SSB candidate locations.

A Fourth Set of Embodiments (Method)

In this set of embodiments, a terminal device does not determine which SS block pattern to use when a received SS block SCS option maps to a plurality of SS block pattern candidates. Instead, the terminal device selects one candidate at a time until identifying the SS block pattern that successfully obtain the SSB locations. The terminal device may choose one of the plurality of SS block pattern candidates iteratively. Alternatively, the terminal device may choose one candidate randomly, or in accordance with a certain sequence, e.g. at first case B, secondly case C.

For example, the terminal device may receive a message indicating that a SS block SCS option of 30 kHz, and the terminal device is in a frequency band with the default SCS setting of 15 kHz, the SS block SCS option is ambiguous as of which SS block pattern (case B or C) to use. In this set of embodiments, the terminal device may use one SS block pattern first, and if it is successful in identifying SSBs by following the SS block pattern's indexing, the SS block pattern is determined to be the one to use for the terminal device at the operating band. The terminal device may use case B first, and it searches for SSBs by monitoring the SSB candidate locations, which are indexed using $\{4, 8, 16, 20\}+28*n$ for the first SSB symbols when carrier frequencies are smaller than or equal to 3 GHz (where n=0 or 1). When no SSBs are found through checking the symbols #4, 8, 16, 20, 32, 36, 44, and 48 for a number of frames (e.g., 20 frames), the terminal device then uses case C to search for SSBs by monitoring the corresponding SSB candidate locations, which are indexed using $\{2, 8\}+14*n$ for the first SSB symbols when carrier frequencies are smaller than or equal to 3 GHz (where n=0 or 1). The SSBs should be found through checking the symbols 2, 8, 16, and 22. If not, after another number of frames, the terminal device may try case B again until the proper SS block pattern is identified.

A Fifth Set of Embodiments (Method)

In this set of embodiments, the ambiguity may be removed by either the network device or the terminal device. In some embodiments, the network device determines which SS block SCS option is compatible with multiple SS block pattern candidates for an operating band of the terminal device, and then avoids to send such SS block SCS option to the terminal device. Thus, the terminal device won't receive such SS block SCS option. Alternatively, the terminal device may disable all but one SS block pattern candidates for the operating band, so that once the SS block SCS option is received, only one SS block pattern candidate is remaining to be used as the SS block pattern selection for the terminal device to obtain the SSB candidate locations.

Therefore, with the above embodiments or any possible combinations thereof, the ambiguity of which one of the plurality of SS block pattern candidates should be applied by a terminal device can be removed. In a practical example, Case B shall be applied when a 30 kHz subcarrier spacing for the SS/PBCH block is indicated from higher layer for frequency bands with a default 15 kHz subcarrier spacing. Thus, with this default SCS pattern, the terminal device can find SS burst sets at right positions in later signal communications.

Further Operations of the Sets of Embodiments

Figure 7A:
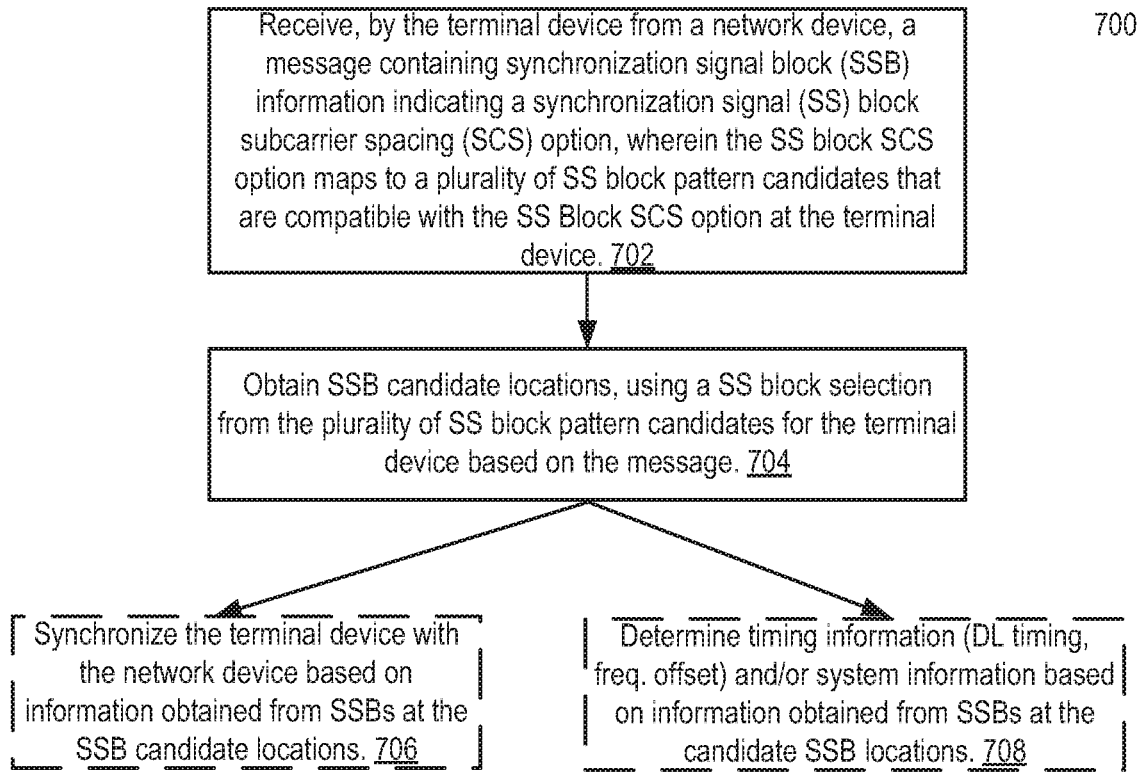
FIG. 7A is a flow diagram showing operations per sets of the embodiments of the invention.

FIG. 7A is a flow diagram showing operations per sets of the embodiments of the invention. Method 700 may be implemented in a terminal device for synchronization signal block (SSB) search in a wireless network. The terminal device is a user equipment (UE) in one embodiment, and it communicates with a network device, which is a base station in one embodiment.

At reference 702, the terminal device receives, from a network device, a message containing synchronization signal block (SSB) information indicating a synchronization signal (SS) block subcarrier spacing (SCS) option. The SS block SCS option maps to a plurality of SS block pattern candidates. Each of the plurality of SS block pattern candidates may be compatible with the SS Block SCS option.

In one embodiment, each of the plurality of SS block pattern candidates operates on 30 k Hz SS Block SCS, but each with a different index set for a first symbol of candidate SS/PBCH blocks.

At reference 704, the terminal device obtains SSB candidate locations, using a SS block pattern selection from the plurality of SS block pattern candidates for the terminal device.

A terminal device may implement the SS block pattern selection in the first set of embodiments discussed herein above. In one embodiment, the SS block pattern selection is determined based on an indication of radio access technology support in the message, the indication indicates at least one of long-term evolution (LTE), new radio (NR). In one embodiment, the indication specifies NR matching around LTE cell specific reference signal (CRS). In one embodiment, the indication specifies an uplink configuration of a frequency shift value as predetermined. In one embodiment, the indication specifies a time division duplex (TDD) frame structure that can coexist with LTE.

A terminal device may implement the SS block pattern selection in the second set of embodiments discussed herein above, and the SS block pattern selection is determined based on a default configuration. The default configuration sets a single SS block pattern selection for an operating band.

A terminal device may implement the SS block pattern selection in the third set of embodiments discussed herein above. In one embodiment, the SS block pattern selection is determined based on an indication for a layer above a physical layer of the terminal device. In one embodiment, the indication for the layer above the physical layer is one or more bits indicating the SS block pattern selection. In one embodiment, the one or more bits indicates the SS block pattern selection for a specific frequency range. In one embodiment, the indication is within a radio resource control (RRC) message.

Figure 7B:
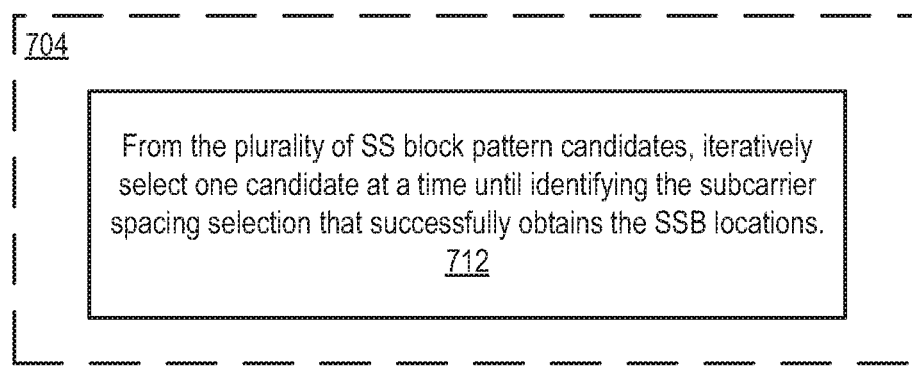
FIG. 7B shows an iterative process of selecting a SS block pattern per one embodiment of the invention.

A terminal device may implement the SS block pattern selection in the fourth set of embodiments discussed herein above. The terminal device determines the SS block pattern selection by trying out SS block pattern candidates one at a time. In one embodiment, the terminal device iteratively selects, from the plurality of SS block pattern candidates, one candidate at a time until identifying the SS block pattern that successfully obtains the SSB locations. FIG. 7B shows the iterative process of selecting a SS block pattern per one embodiment of the invention.

A terminal device may implement the SS block pattern selection in the fifth set of embodiments discussed herein above. The terminal device disables all but one SS block pattern candidate in one embodiment of the invention.

Once the SSB candidate locations are obtained, the terminal device may use the information obtained from SSBs at the SSB candidate locations. When the terminal device needs to synchronize with the network device, it may use the information to synchronize the terminal device with the network device based on information obtained from SSBs at the SSB candidate locations at reference 706. When the terminal device is already synchronized with the network device, it may determine timing information based on information obtained from SSBs at the SSB candidate locations at reference 708. Additionally, the terminal device may also obtain fundamental system information from the PBCH blocks in some embodiments.

Physical Resources Used in a Wireless Network

Figure 8A:
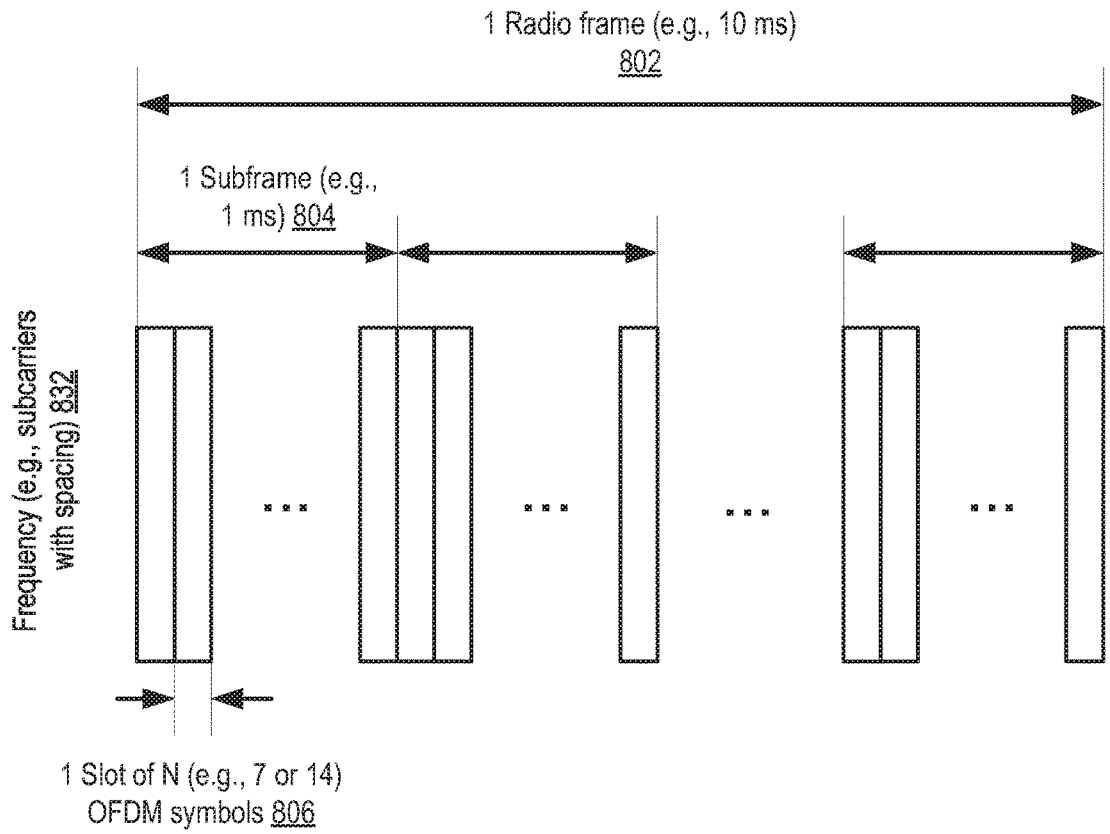
FIG. 8A shows an exemplary signal transmission hierarchy in a wireless network.

The determination of synchronization signal (SS) block mapping pattern discussed herein above uses signaling and resources in a wireless network. FIG. 8A shows an exemplary signal transmission hierarchy in a wireless network. The exemplary signal transmission hierarchy includes the transmission unit of frame such as radio frame 802. A radio frame 802 takes ten milliseconds to transmit in one embodiment. The frame may contain a number of subframes such as subframe 804. In this example, the radio frame 802 contains ten subframes, each takes one millisecond. Each subframe may contain a number of slots. For example, a subframe may contain two slots. Each slot such as the slot at reference 806 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 832), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHz or 15 kHz) for transmission. One subcarrier x one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 8B:
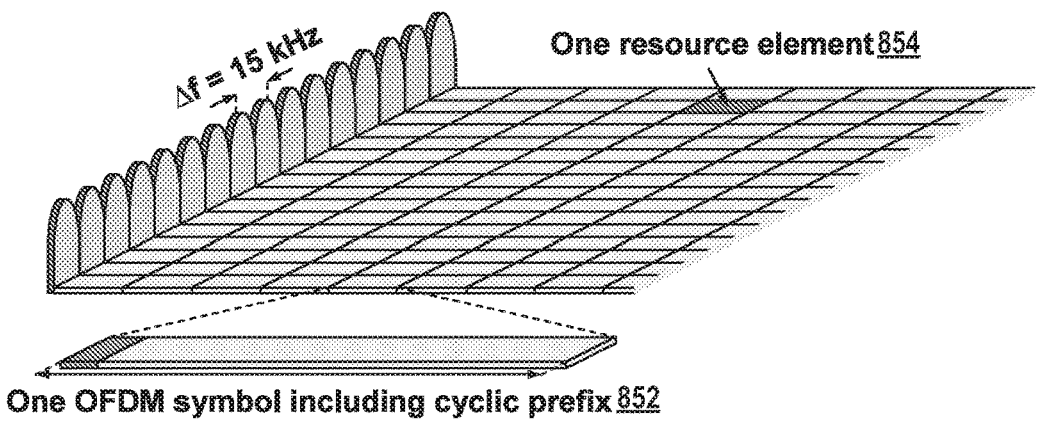
FIG. 8B shows resource elements used for data and signaling transmission.

FIG. 8B shows resource elements used for data and signaling transmission. The physical resources for transmission may be view as time and frequency grids as illustrated, where each resource element occupies a time period in the time domain and a frequency range in the frequency domain. Each OFDM symbol includes a cyclic prefix as illustrated at reference 852. Each OFDM symbol utilizes a number of resource elements. In this example, the subcarrier spacing is 15 k Hz, and the resource element (RE) 852 occupies an orthogonal frequency-division multiplexing (OFDM) subcarriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For downlink control, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

Different NR use-cases (e.g. MBB (mobile broadband), URLLC (ultra-reliable low latency communication)) require different control regions (e.g. time, frequency, numerologies etc.) & PDCCH configurations (e.g. operating points etc.) PDCCHs in NR are transmitted in configurable/dynamic control regions called control resource sets (CORESET) enabling variable use-cases. A CORESET is a subset of the downlink physical resource configured to carry control signaling. It is analogous to the control region in LTE but generalized in the sense that the set of physical resource blocks (PRBs) and the set of OFDM symbols in which it is located is configurable.

In one embodiment, CORESET configuration in frequency allocation is done in units of 6 RBs using NR DL resource allocation Type 0: bitmap of RB groups (RBGs). CORESET configuration in time spans of 1-3 consecutive OFDM symbols. For slot-based scheduling, the CORESET span at the beginning of a slot is at most 2 if demodulation reference signal (DMRS) is located in OFDM Symbol (OS) #2 and is at most 3 if DMRS is located in OS #3. A UE monitors one or more CORESETs. Multiple CORESETs can be overlapped in frequency and time for a UE.

Some Embodiments of the Invention (Systems)

Figure 9:
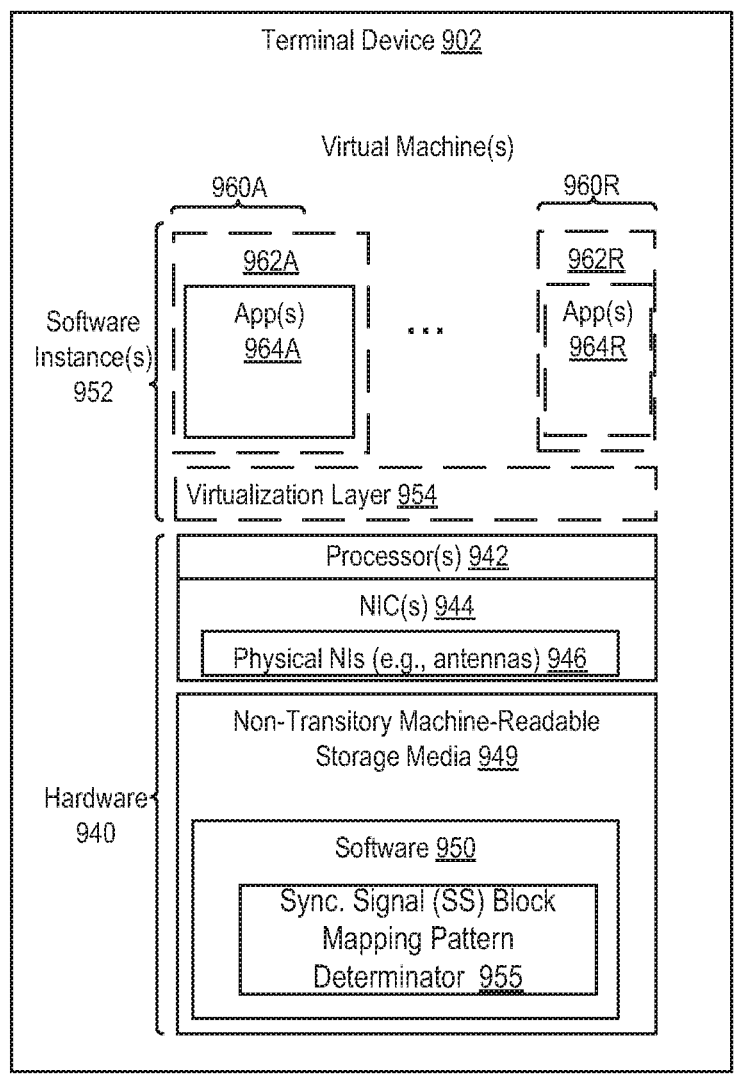
FIG. 9 shows a network device per one embodiment of the invention.

FIG. 9 shows a terminal device per one embodiment of the invention. The terminal device 902 may be the terminal devices 502 or 504. The terminal device 902 may be implemented using custom application-specific integrated-circuits (ASICs) as processors and a special-purpose operating system (OS), or common off-the-shelf (COTS) processors and a standard OS.

The terminal device 902 includes hardware 940 comprising a set of one or more processors 942 (or "processor circuitry," which are typically COTS processors or processor cores or ASICs) and physical NIs 946, as well as non-transitory machine-readable storage media 949 having stored therein software 950. During operation, the one or more processors 942 may execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R run on top of a guest operating system within an instance 962A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The software 950 contains a synchronization signal (SS) block mapping pattern determinator (SBMPT) 955. The synchronization signal (SS) block mapping pattern determinator (SBMPT) 955 may perform operations in the operations described with reference to earlier figures. The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual terminal device 960A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The NI is shown as network interface card (NIC) 944. The physical network interface 946 may include one or more antenna of the terminal device 902. An antenna port may or may not correspond to a physical antenna. The antenna comprises one or more radio interfaces.

Other Embodiments of the Invention
(Systems/Methods)

Figure 10:
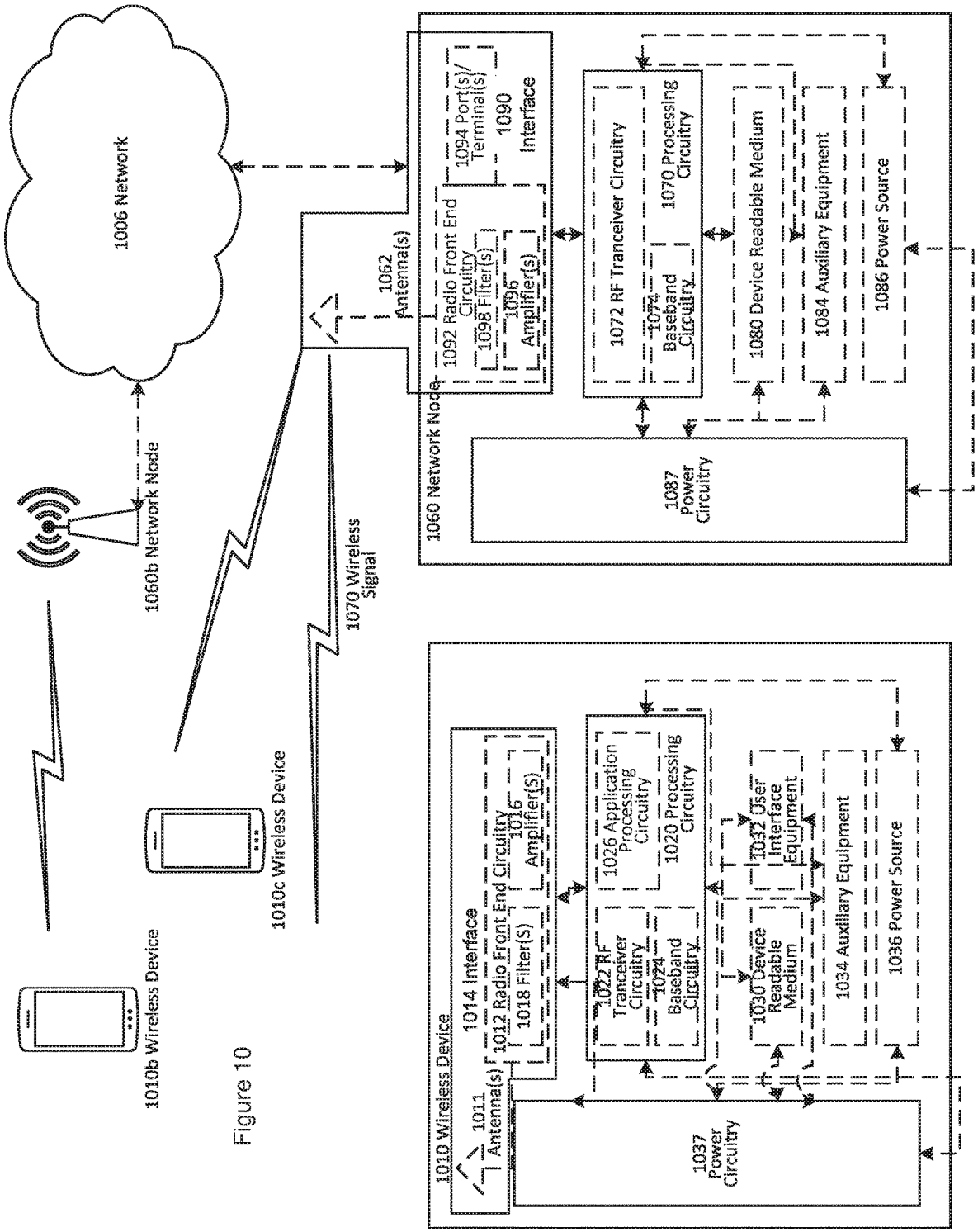
FIG. 10 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1061 and 1060*b*, and WDs 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node, similar to network device discussed herein above, refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SoC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 674 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 606, and/or WDs 1010. As illustrated, interface 1090 comprises port(s)/terminal(s) 1094 to send and receive data, for example to and from network 606 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 694, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 686. Power source 686 and/or power circuitry 1087 may be configured to provide power to the various components of network node 1060 in a form suitable for the respective components (e.g., at a voltage and current level needed for each respective component). Power source 686 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 686 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 620 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 620. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally. In one embodiment, device readable medium 1030 includes SBMPT 955, which may perform operations as discussed herein above.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 636 to make the power suitable for the respective components of WD 1010 to which power is supplied.

Figure 11:
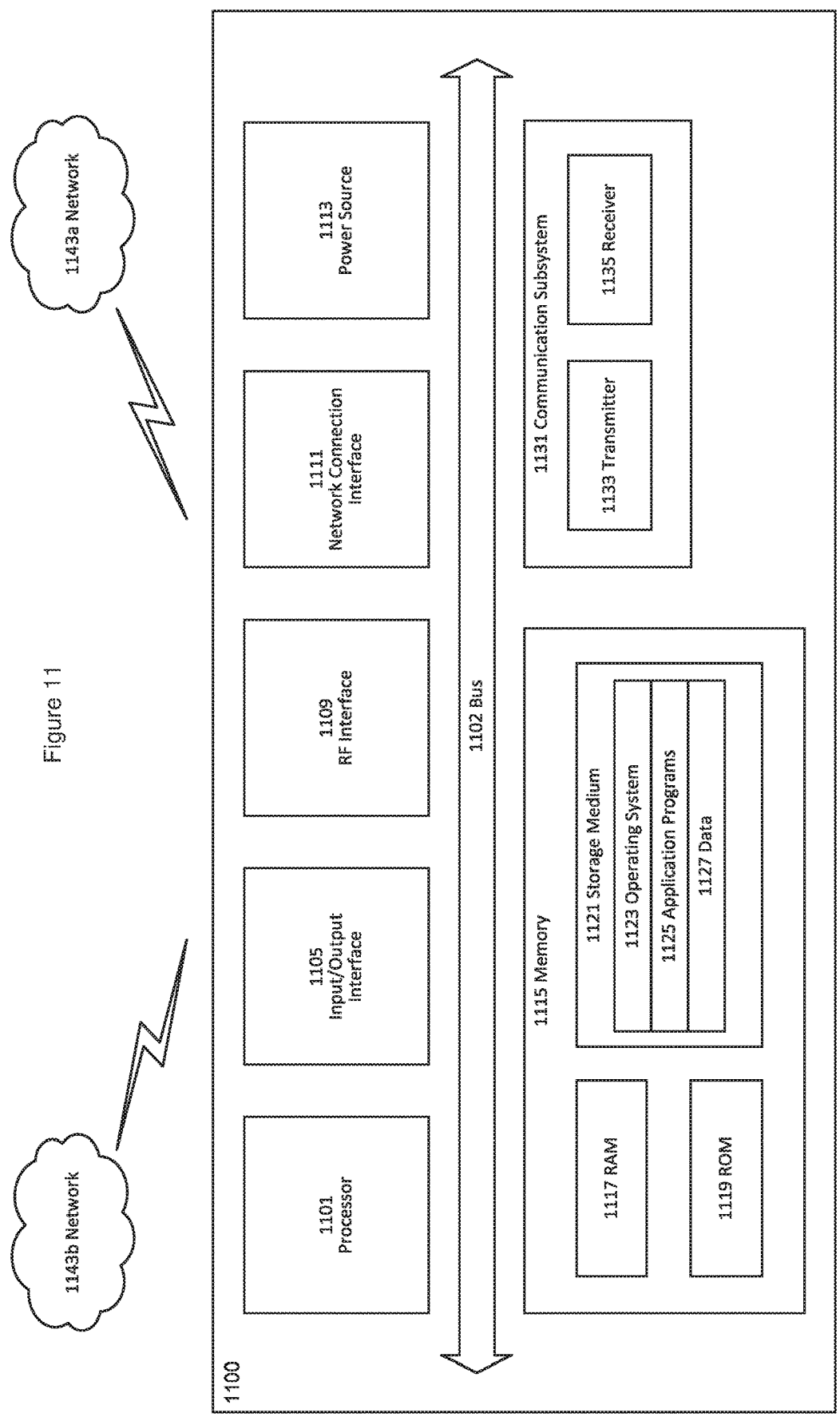
FIG. 11 shows a user Equipment in accordance with some embodiments.

FIG. 11 shows one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc. In one embodiment, application program 1125 includes SBMPT 955 discussed herein above.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. 'Network 743a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
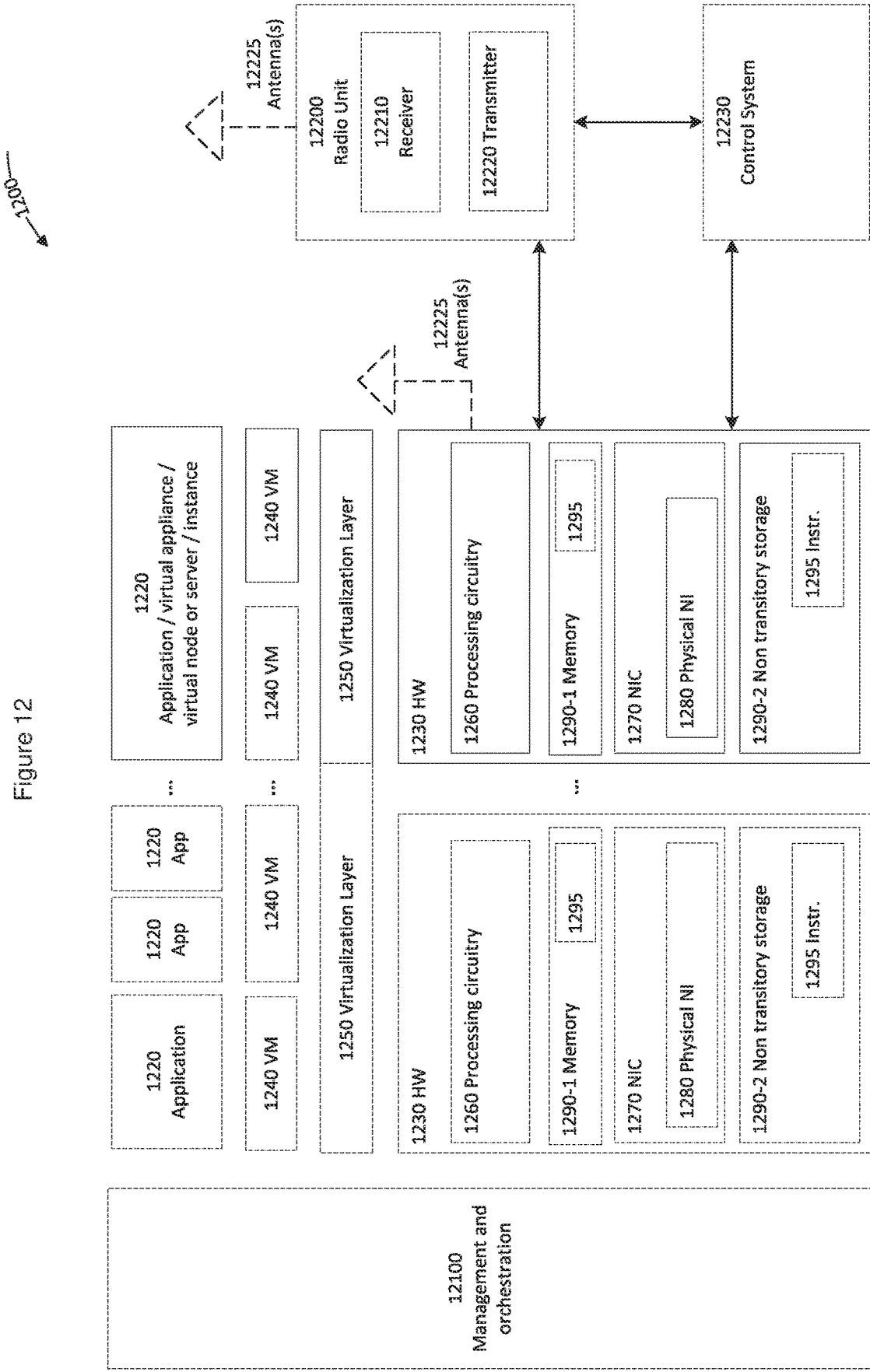
FIG. 12 shows a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 1230 and radio units 12200.

Figure 13:
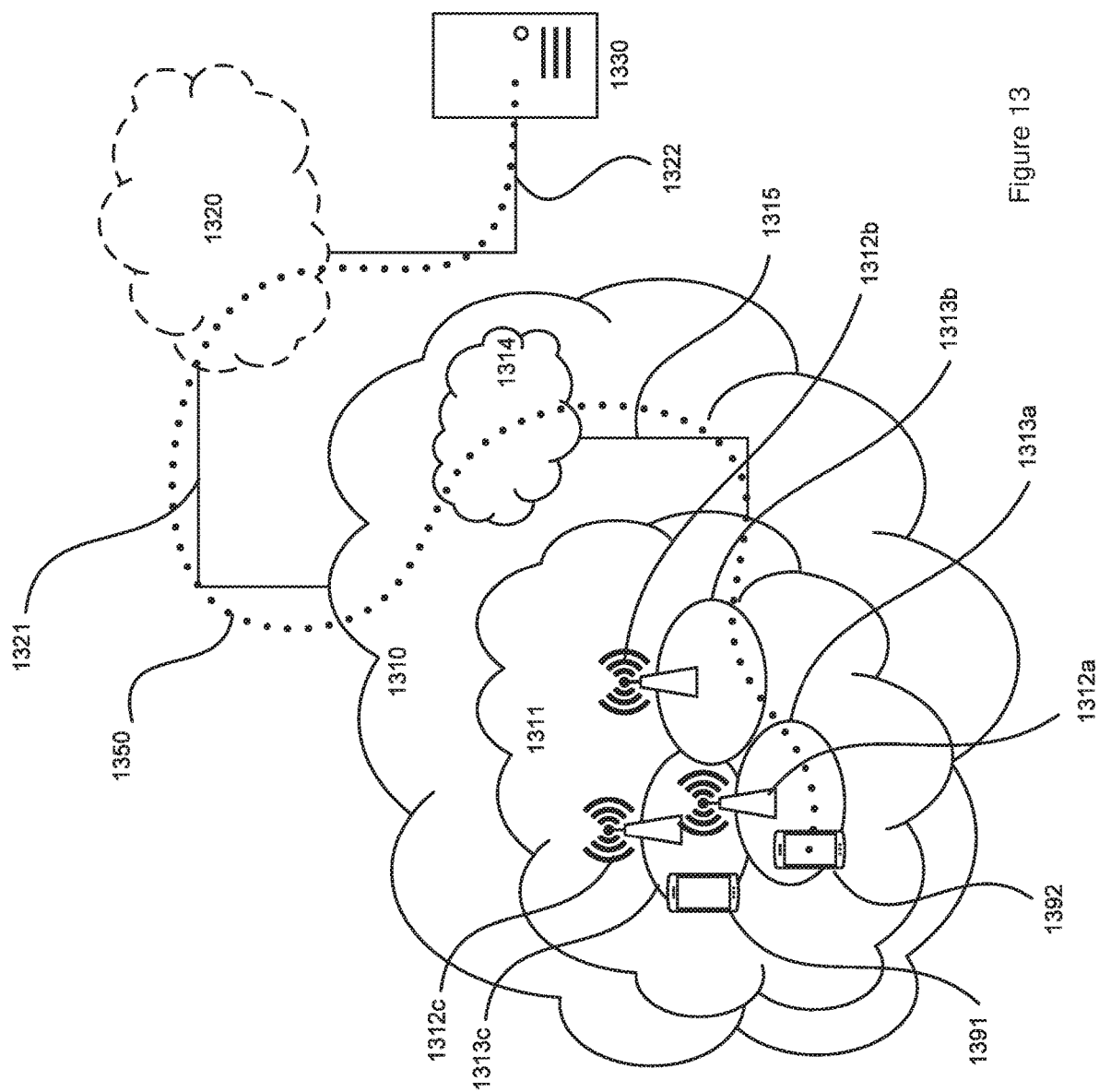
FIG. 13 shows a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. The hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
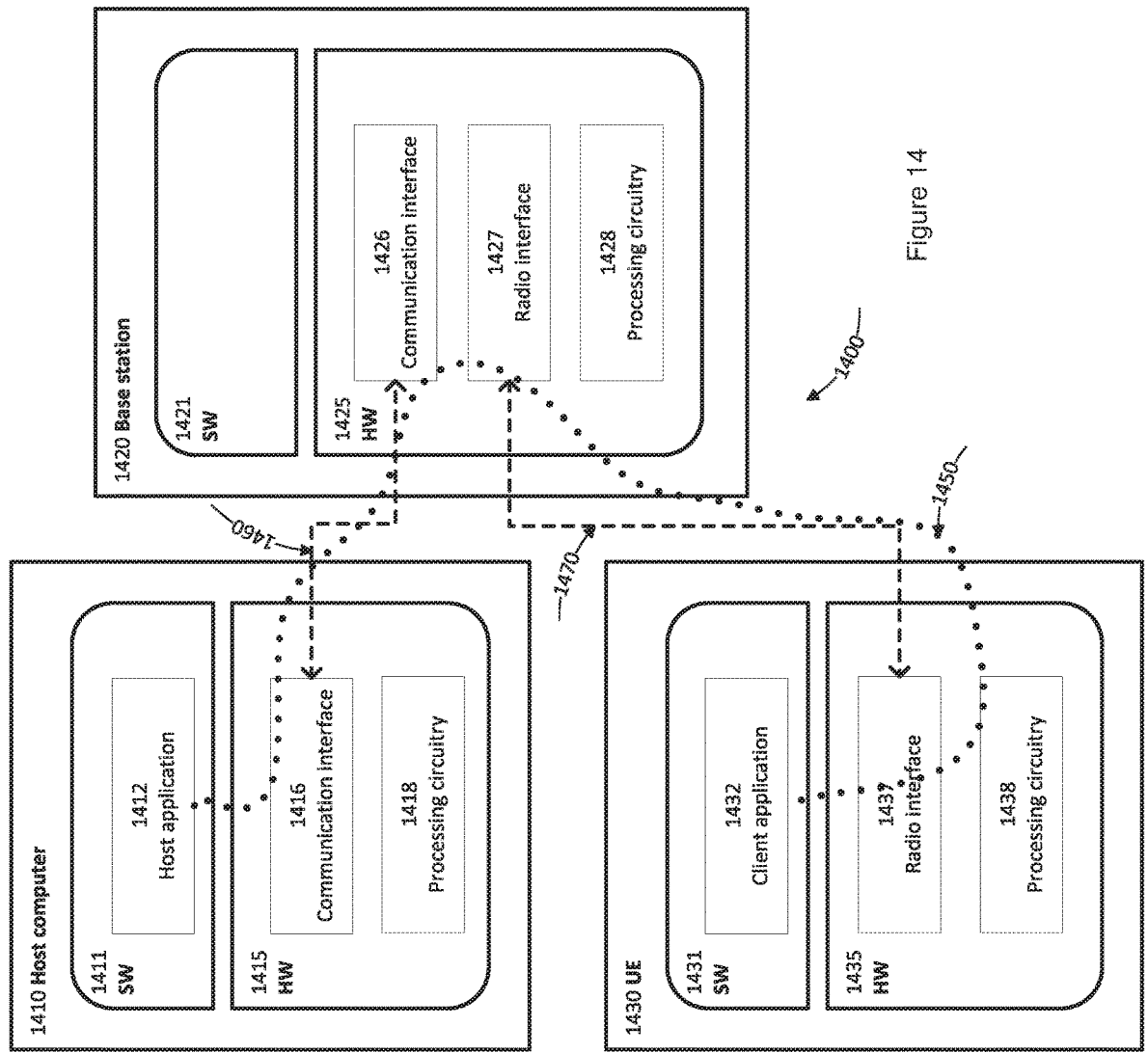
FIG. 14 shows a host computer communicating via a base station with a user equipment over a partially wireless connection in accordance with some embodiments.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
FIG. 15 shows a method implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
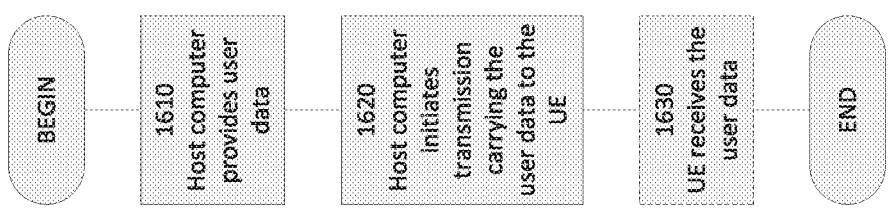
FIG. 16 shows a method implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
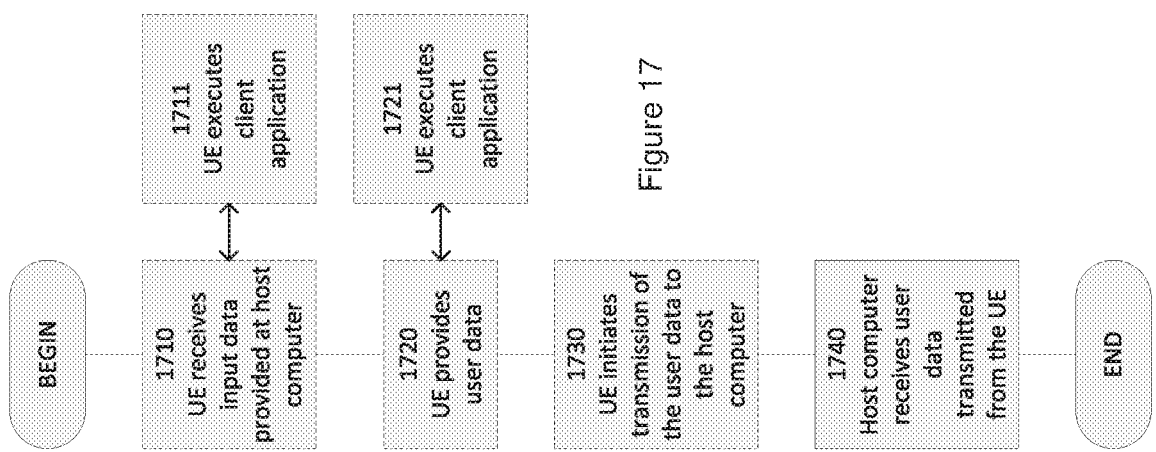
FIG. 17 shows a method implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
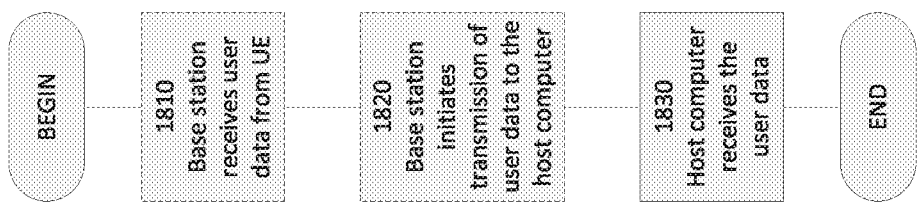
FIG. 18 shows a method implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Abbreviations

At least some of the following abbreviations may be used in this disclosure. If there is an inconsistency between abbreviations, preference should be given to how it is used above. If listed multiple times below, the first listing may be preferred over any subsequent listing:

3G Third Generation of Mobile Telecommunications Technology
3GPP Third Generation Partnership Project
ARP Allocation Retention Priority
BLER Block Error Rate
BSM Basic Safety Message
BSR Buffer Status Report
BW Bandwidth
CA Carrier Aggregation
CAM Cooperative Awareness Message
CBR Channel Busy Ratio
CORESET Control Resource Set
CRC Cyclic Redundancy Check
CRS Cell-specific Reference Signal
CSI-RS Channel State Information-Reference Signal
D2D Device-to-Device Communication
DBS Delay-Based Scheduler
DCI Downlink Control Information
DENM Decentralized Environmental Notification Message
DL Downlink
DMRS Demodulation reference signals
DPTF Data Packet Transmission Format
DSRC Dedicated Short-Range Communications
eNB eNodeB
EPRE Energy Per Resource Element
ETSI European Telecommunications Standards Institute
eV2X Enhanced V2X
FDM Frequency Division Multiplexing
GSCN Global Synchronization Channel Number
ID Identifier
IP Internet Protocol
ITS Intelligent Transport Systems
LCG Logical Channel Group
LCID Logical Channel Identity
LTE Long-Term Evolution
MAC Medium Access Control
MAC CE Medium Access Control-Control Element
ME Mobile Equipment
MIB Master Information Block
MSG Message
NR New Radio
NSA Non-Stand-Alone
OCC Orthogonal cover code
OFDM Orthogonal Frequency Division Multiplexing
OS OFDM Symbol
OSI Other System Information
PBCH Physical Broadcast Channel
PDB Packet Delay Budget
PDCCH Physical Downlink Control Channel
PDCP packet data convergence protocol
PDSCH Physical Downlink Shared Channel
PDU Protocol Data Unit
PPPP ProSe Per Packet Priority
PRB Physical Resource Block
ProSe Proximity Services
PUCCH Physical Uplink Control Channel
PUSCH Physical Uplink Shared Channel
RAR Random Access Response
RMSI Remaining Minimum System Information
RNTI Radio Network Temporary Identifier
RRC Radio Resource Control
RS Reference Signals
RV Redundancy Version

What is claimed is:

1. A method implemented at a terminal device for synchronization signal block (SSB) search in a wireless network, the method comprising:
receiving, from a network device, a message containing an indication of a subcarrier spacing (SCS) of SSB, wherein the SCS of SSB maps to a plurality of SSB pattern candidates;
determining an SSB pattern from the plurality of SSB pattern candidates at least partly according to the SCS of SSB as indicated by the message and default settings of the terminal device when operating standalone, wherein the determining the SSB pattern comprises:
responsive to the indicated SCS of SSB being 30 kHz and an SCS of SSB in the default settings corresponding to operating band being 15 kHz, determining that Case B of subcarrier spacing applies for the operating band; and
obtaining SSB candidate locations based on the determined SSB pattern for SSB search.

2. The method of claim 1, wherein the indicated SCS of SSB is 30 kHz.

3. The method of claim 1, wherein the plurality of SSB pattern candidates is deployed considering different likelihood of Long Term Evolution-New Radio (LTE-NR) co-existing band.

4. The method of claim 1, wherein the determining the SSB pattern from the plurality of SSB pattern candidates comprises:
when the indicated SCS of SSB differs from the SCS of SSB in the default settings corresponding to the operating band, determining the SSB pattern with higher likelihood of LTE-NR co-existing band.

5. The method of claim 1, wherein the determining the SSB pattern from the plurality of SSB pattern candidates comprises:
when the indicated SCS of SSB is compatible with a plurality of SSB pattern candidates in the default settings, determining a default SSB pattern according to a default configuration corresponding to the operating band.

6. The method of claim 1, wherein the message is a radio resource control (RRC) message.

7. The method of claim 1, wherein the terminal device is a user equipment (UE).

8. The method of claim 1, wherein the network device is a network node.

9. The method of claim 1, further comprising:
synchronizing the terminal device with the network device based on information obtained from SSBs at the SSB candidate locations.

10. The method of claim 1, further comprising:
determining timing information based on information obtained from SSBs at the SSB candidate locations.

11. The method of claim 1, wherein the determining the SSB pattern from the plurality of SSB pattern candidates comprises:
when the indicated SCS of SSB differs from the SCS of SSB in the default settings corresponding to the operating band, determining the SSB pattern with Case B of subcarrier spacing.

12. A terminal device to be deployed in a wireless network, comprising a processor and computer-readable storage medium that provides instructions that, when executed by the processor, perform:

receiving, from a network device, a message containing an indication of a subcarrier spacing (SCS) of SSB, wherein the SCS of SSB maps to a plurality of SSB pattern candidates;

determining an SSB pattern from the plurality of SSB pattern candidates at least partly according to the SCS of SSB as indicated by the message and default settings of the terminal device when operating standalone, wherein the determining the SSB pattern comprises: responsive to the indicated SCS of SSB being 30 kHz and an SCS of SSB in the default settings corresponding to operating band being 15 kHz, determining that Case B of subcarrier spacing applies for the operating band; and obtaining SSB candidate locations based on the determined SSB pattern for SSB search.

13. The terminal device of claim 12, wherein the indicated SCS of SSB is 30 kHz.

14. The terminal device of claim 13, wherein the plurality of SSB pattern candidates is deployed considering different likelihood of Long Term Evolution-New Radio (LTE-NR) co-existing band.

15. The terminal device of claim 12, wherein the determining the SSB pattern from the plurality of SSB pattern candidates comprises:

when the indicated SCS of SSB differs from the SCS of SSB in the default settings corresponding to the operating band, determining the SSB pattern with higher likelihood of LTE-NR co-existing band.

16. The terminal device of claim 12, wherein the determining the SSB pattern from the plurality of SSB pattern candidates comprises:

when the indicated SCS of SSB is compatible with a plurality of SSB pattern candidates in the default settings, determining a default SSB pattern according to a default configuration corresponding to the operating band.

17. The terminal device of claim 12, wherein the determining the SSB pattern from the plurality of SSB pattern candidates comprises:

when the indicated SCS of SSB differs from the SCS of SSB in the default settings corresponding to the operating band, determining the SSB pattern with Case B of subcarrier spacing.

18. A non-transitory computer-readable storage medium that provides instructions that, when executed by a processor, cause the processor to perform operations comprising:

receiving, at a terminal device from a network device, a message containing an indication of a subcarrier spacing (SCS) of SSB, wherein the SCS of SSB maps to a plurality of SSB pattern candidates;

determining an SSB pattern from the plurality of SSB pattern candidates at least partly according to the SCS of SSB as indicated by the message and default settings of the terminal device when operating standalone, wherein the determining the SSB pattern comprises: responsive to the indicated SCS of SSB being 30 kHz and an SCS of SSB in the default settings corresponding to operating band being 15 kHz, determining that Case B of subcarrier spacing applies for the operating band; and obtaining SSB candidate locations based on the determined SSB pattern for SSB search.

19. The non-transitory computer-readable storage medium of claim 18, wherein the indicated SCS of SSB is 30 kHz.

20. The non-transitory computer-readable storage medium of claim 19, wherein the plurality of SSB pattern candidates is deployed considering different likelihood of Long Term Evolution-New Radio (LTE-NR) co-existing band.

* * * * *